(12) United States Patent
Huang

(10) Patent No.: US 12,413,258 B2
(45) Date of Patent: Sep. 9, 2025

(54) WIRELESS RECEIVER APPARATUS AND METHOD

(71) Applicant: EVERACTIVE, INC., Santa Clara, CA (US)

(72) Inventor: Kuo-Ken Huang, Santa Clara, CA (US)

(73) Assignee: Everactive, Inc., Charlottesville, VA (US)

( * ) Notice: Subject to any disclaimer, the term of this patent is extended or adjusted under 35 U.S.C. 154(b) by 321 days.

(21) Appl. No.: 18/318,875

(22) Filed: May 17, 2023

(65) Prior Publication Data
US 2023/0291424 A1    Sep. 14, 2023

Related U.S. Application Data

(63) Continuation of application No. 17/474,231, filed on Sep. 14, 2021, now Pat. No. 11,689,230, which is a continuation of application No. 17/015,942, filed on Sep. 9, 2020, now Pat. No. 11,146,299.

(60) Provisional application No. 62/897,770, filed on Sep. 9, 2019.

(51) Int. Cl.
| | |
|---|---|
| H04B 7/06 | (2006.01) |
| H04B 1/00 | (2006.01) |
| H04B 1/10 | (2006.01) |
| H04L 27/08 | (2006.01) |

(52) U.S. Cl.
CPC ............. *H04B 1/10* (2013.01); *H04B 1/0028* (2013.01); *H04B 1/0078* (2013.01); *H04L 27/08* (2013.01)

(58) Field of Classification Search
CPC ...... H04B 1/10; H04B 1/0028; H04B 1/0078; H04B 1/18; H04L 27/08; H04L 27/06; Y02D 30/70
USPC .......................................... 375/262
See application file for complete search history.

(56) References Cited

U.S. PATENT DOCUMENTS

| | | | |
|---|---|---|---|
| 6,343,185 B1 | 1/2002 | Aoshima et al. | |
| 6,535,724 B1 | 3/2003 | Pernici et al. | |
| 6,646,604 B2 | 11/2003 | Anderson | |
| 6,853,835 B2 | 2/2005 | Wynbeck | |
| 6,867,696 B2 | 3/2005 | Becken | |
| 7,283,475 B2 | 10/2007 | Fortin et al. | |
| 7,362,781 B2 | 4/2008 | Rhoads | |
| 7,415,018 B2 | 8/2008 | Jones et al. | |
| 7,571,269 B2 | 8/2009 | Schmidt et al. | |
| 7,693,191 B2 | 4/2010 | Gorday | |
| 7,715,446 B2 | 5/2010 | Rhoads | |
| 7,813,344 B2 | 10/2010 | Cheswick | |
| 8,027,663 B2 | 9/2011 | Rhoads | |

(Continued)

OTHER PUBLICATIONS

Selected USPTO Documents from 2003/0091064.

(Continued)

*Primary Examiner* — Tanmay K Shah
(74) *Attorney, Agent, or Firm* — Dilworth & Barrese, LLP; Barbara B. Courtney, Esq.

(57) ABSTRACT

Embodiments of the invention include a wakeup receiver (WRX) featuring a charge-domain analog front end (AFE) with parallel radio frequency (RF) rectifier, charge-transfer summation amplifier (CTSA), and successive approximation analog-to-digital converter (SAR ADC) stages. The WRX operates at very low power and exhibits above-average sensitivity, random pulsed interferer rejections, and yield over process.

14 Claims, 9 Drawing Sheets

(56) References Cited

U.S. PATENT DOCUMENTS

| | | | |
|---|---|---|---|
| 8,081,944 | B2 | 12/2011 | Shaolin |
| 8,325,704 | B1 | 12/2012 | Emkin et al. |
| 8,848,777 | B2 | 9/2014 | Wang |
| 8,891,595 | B1* | 11/2014 | Farjadrad ............ H04B 1/0475 |
| | | | 375/257 |
| 10,089,856 | B1 | 10/2018 | Zong |
| 11,146,299 | B2 | 10/2021 | Huang |
| 2003/0040326 | A1 | 2/2003 | Levy et al. |
| 2003/0076782 | A1 | 4/2003 | Fortin |
| 2003/0084148 | A1 | 5/2003 | Cousins |
| 2003/0091064 | A1 | 5/2003 | Partridge |
| 2003/0097439 | A1 | 5/2003 | Strayer |
| 2003/0203740 | A1 | 10/2003 | Bahl |
| 2004/0001221 | A1 | 1/2004 | McCallum |
| 2004/0059935 | A1 | 3/2004 | Cousins |
| 2005/0054319 | A1 | 3/2005 | Tamaki |
| 2005/0169201 | A1 | 8/2005 | Huylebroeck |
| 2005/0186906 | A1 | 8/2005 | Hussmann |
| 2007/0082647 | A1 | 4/2007 | Behzad |
| 2007/0082715 | A1 | 4/2007 | Rofougaran |
| 2008/0046549 | A1 | 2/2008 | Saxena |
| 2008/0240167 | A1 | 10/2008 | Keaney |
| 2009/0047991 | A1 | 2/2009 | Elg |
| 2010/0003935 | A1 | 1/2010 | Behzad |
| 2010/0067546 | A1 | 3/2010 | Mishra |
| 2010/0079254 | A1 | 4/2010 | Koo et al. |
| 2010/0105346 | A1 | 4/2010 | Huang |
| 2010/0120362 | A1 | 5/2010 | Walley et al. |
| 2010/0202767 | A1 | 8/2010 | Shirakawa et al. |
| 2011/0292977 | A1* | 12/2011 | Farjadrad ............. H04L 12/10 |
| | | | 375/220 |
| 2011/0299638 | A1 | 12/2011 | Gauthier |
| 2011/0317600 | A1 | 12/2011 | Thomson et al. |
| 2012/0256009 | A1 | 10/2012 | Mucignat et al. |
| 2013/0039239 | A1 | 2/2013 | Lin |
| 2013/0040573 | A1 | 2/2013 | Hillyard |
| 2013/0322313 | A1 | 12/2013 | Sikri |
| 2013/0336188 | A1 | 12/2013 | Yomo |
| 2014/0126442 | A1 | 5/2014 | Jafarian |
| 2014/0146756 | A1 | 5/2014 | Sahin |
| 2014/0254827 | A1* | 9/2014 | Bailey .................. H04R 3/04 |
| | | | 381/98 |
| 2015/0036575 | A1 | 2/2015 | Li |
| 2015/0333534 | A1 | 11/2015 | Liu et al. |
| 2018/0115195 | A1 | 4/2018 | Dalwadi |
| 2019/0097633 | A1 | 3/2019 | Ullmann et al. |
| 2019/0222126 | A1 | 7/2019 | Parisi et al. |
| 2020/0097112 | A1* | 3/2020 | Seo ..................... G06F 3/044 |

OTHER PUBLICATIONS

Berk, Vincent, et al., "Detection of Covert Channel Encoding in Network Packet Delays," Technical Report TR2005-536, Department of Computer Sciences, Dartmouth College, Hanover, NH, Aug. 2005.
Calhoun, Telvis E., et al., "An 802.11 MAC Layer Covert Channel," Wireless Communications and Mobile Computing (2010), Wiley InterScience www.interscience.wiley.com; DOI: 10.1002/wcm.969, Department of Computer Sciences, Georgia State University, Atlanta, GA 30303, USA.
Dye, Derek, "Bandwidth and detection of packet length cover channels," Issue date Mar. 2011, Monterey, California, Naval Postgraduate School, http://hdl.handle.net/10945/5724.
Edwards, Jonathan, "Covert Channels in Ad Hoc Networking: An Analysis Using the Optimized Link State Routing Protocol," A thesis submitted to the Faculty of Graduate and Postdoctoral Affairs in partial fulfillment of the requirements for the degree of Master of Applied Sciences in Electrical Computer Engineering, Carleton University, Ontario, Canada, Apr. 2012.
Girling, Gary, "Covert Channels in LAN's," IEEE Transactions on Software Engineering, vol. SE-13, No. 2, Feb. 1987.
Handel, Theodore, et al., "Hiding Data in the OSI Network Model," Weapon Design Technology Group, Los Alamos, NM 87545, pp. 23-38.
Ji, Liping, et al., "A Novel Covert Channel Based on Length of Messages," 2009 International Symposium on Information Engineering and Electronic Commerce, Harbin Institute of Technology, Shenzhen Graduate School Shenzhen, P.R. China.
Kondo, Yoshihisa, et al., "Wake-up Radio using IEEE 802.11 Frame Length Modulation for Radio-on-Demand Wireless LAN," 2011 IEE 22nd International Symposium on Personal, Indoor and Mobile Radio Communications.
Kratzer, Christian, et al., "WLAN Steganography: A First Practical Reivew," Copyright 2006 ACM 1-59593-493-6060009, Department of Computer Science, Research Group Multimedia and Security, MM & Sec '06, Sep. 26-27, 2006, Geneva, Switzerland.
Lucena, Norka B., et al., "Covert Channels in IPv6," Syracuse University, Syracuse, NY 13244 USA, Copyright 2006, Springer-Verlag Berlin Heidelberg 2006, pp. 147-166.
Padlipsky, M.A., et al., "Limitations of End-to-End Encryption in Secure Computer Networks", Deputy for Technical Operations, Electronic Systems Division, Air Force Systems Command, Hanscom Air Force Base, Massachusetts; Pepared by The Mitre Corporation, Project 672B, Aug. 1978.
Panajotov, Boris, et al., "Covert Channels in TCP/IP Protocol Stack," ICT Innovations 2013 Web Proceedings ISSN 1857-7288, University "Goce Delcev", Faculty of Computer Science, "Krste Misirkov" bb, 2000, Stip, Republic of Macedonia, pp. 190-199.
Scott, Carlos, "Network Covert Channels: Review of Current State and Analysis of Viability of the Use of X.509 Certificates for Covert Communications," Technical Report RHUL-MA-2008-11, Jan. 15, 2008, Royal Holloway University of London, Department of Mathematics, England.
Stelte, Bjorn, et al., "Concealed Integrity Monitoring for Wireless Sensor Networks," Wireless Sensor Network, 2011, 3, 10-17, doi: 10.4236/wsn.2011.31002, Published online Jan. 2011, http://www.scirp.org/journal.wsn.
Wolf, Manfred, "Covert Channels in LAN Protocols," Tele-Consulting GMBH, Germany, pp. 91-101.
Yuan, Bo, et al., "A Covert Channel in Packet Switching Data Networks," Department of Networking, Security and Systems Administration, Rochester Institute of Technology, Rochester, NY 14623.
Zander, Sebastian, et al., "A Survey of Covert Channels and Countermeasures in Computer Network Protocols," 3rd Quarter 2007, vol. 9, No. 3, IEE Communications Survey, The Electronic Magazine of Original Peer-Reviewed Survey Articles, www.comsoc.org/pubs/surveys.
Zander, Sebastian, "Performance of Selected Noisy Covert Channels and Their Countermeasures in IP Networks," Thesis submitted in accordance with the requirements for the degree of Doctor of Philosophy, Swinburne University of Technology, Melbourne, Australia, Copyright May 2010.
Zhang, Xinyu, et al., "Gap Sense: Lightweight Coordination of Heterogeneous Wireless Devices," University of Wisconsin—Madison and the University of Michigan—Ann Arbor, supported in part by NSF Grant CNS-1160775.
Patent Cooperation Treaty, International Searching Authority, "Notification of Transmittal of the International Search Report and the Written Opinion," PCT Application No. PCT/US16/27280; date of mailing Jul. 15, 2016.
Patent Cooperation Treaty, "International Preliminary Report on Patentability," PCT Application No. PCT/US2014/028889, issued Sep. 15, 2015.
Chinese Intellectual Property Office, Patent Application No. 201480028106.0, English translation of First Office Action Issued Jul. 14, 2017.
Chinese Intellectual Property Office, Patent Application No. 201480028106.0, English translation of Third Office Action Issued Aug. 16, 2018.
European Patent Office, EP Patent Application No. 14771024.8, Examination Report No. 1, issued Apr. 25, 2017.
European Patent Office, EP Patent Application No. 14771024.8, Examination Report No. 2, issued Feb. 19, 2018.

(56) References Cited

OTHER PUBLICATIONS

Korean Intellectual Property Office (KIPO), Patent Application No. 10-2015-7029467, English translation of Office Action, received from Korean associates on Aug. 21, 2017.
Korean Intellectual Property Office (KIPO), Patent Application No. 10-2015-7029467, English translation of Office Action, received from Korean associates on Jul. 10, 2018.

* cited by examiner

WIRELESS RECEIVER APPARATUS AND METHOD

CROSS-REFERENCE TO RELATED PATENT APPLICATION

This application is a continuation of U.S. patent application Ser. No. 17/474,231, filed Sep. 14, 2021, which is a continuation of U.S. patent application Ser. No. 17/015,942, filed Sep. 9, 2020, and claims priority from U.S. Provisional Patent Application No. 62/897,770, filed Sep. 9, 2019, which all are incorporated by reference in their entirety herein.

FIELD OF THE INVENTION

The invention is in the field of low-power sensor networks such as those that facilitate the internet of things (IoT).

BACKGROUND

Networks of wireless sensor nodes have become ubiquitous in the internet of things (IoT). As the technologies related to IoT evolve, the main goals for development of components include improved (reduced) power consumption, increased speed/higher data rate, better sensitivity, and robustness.

Ultra low power (ULP) receivers are gaining traction in various consumer and industrial markets as new standards are being defined to support them in IoT devices. Communication standards such as WiFi 802.11ba, BLE, and NB-IoT are all considering operating modes and signaling that take advantage of ULP receivers as companion radios for several reasons. They significantly reduce active and average power while providing continuous connectivity, thus enabling batteryless operation. They also simplify provisioning of new nodes, reduce synchronization energy overhead and latency to nearly zero, scale to networks of 1000s of nodes, and enable microsecond (ms) wakeup latency. ULP receivers have been demonstrated with better than-100 dBm sensitivity and 10 nW, but none have addressed aspects for widespread adoption such as selectivity, random pulsed interferer rejection, yield over process, voltage and temperature (PVT) variations, and security against replay or energy attacks.

A key component of wireless sensor networks are sensor nodes, which include main circuit components such as wakeup receivers (WRXs). Because of the nature of the network, these receivers are typically ULP receivers. Most IoT networks comprise many ULP receivers that are tasked with receiving radio frequency (RF) wireless signals over the air (OTA) and taking some local action based on the ULP receiver's interpretation of the received RF signals. Translating the received RF signal into a local action typically involves translating the continuous RF signal to some discrete "on/off" (e.g., Wakeup) type of message to a local component of the IoT system.

Current sensor nodes may have some low power characteristics. For example, certain ULP receive frontends that feature continuous-time analog circuitry do consume a relatively low amount of power. But they exhibit low sensitivity, and poor robustness in the presence of interference and across wide temperature range.

Another current type of ULP receive frontend is an intermediate frequency (IF) frontend with a continuous-time mixer and amplifiers. This type of frontend exhibits good sensitivity and selectivity characteristics, but consumes a relatively large amount of power.

Current ULP receiver frontends tend to rely on continuous-time analog approaches to receive, process, translate, and transmit RF signals in sensor networks.

It would be desirable to have a ULP receiver that overcomes the stated challenges of the current solutions. It would be desirable to have a ULP receiver that operates at very low power, and exhibits: above-average sensitivity; random pulsed interferer rejections; yield over process; voltage and temperature (PVT) variations; and security against replay or energy attacks.

DETAILED DESCRIPTION

Embodiments of the invention include a wakeup receiver (WRX) featuring a charge-domain analog front end (AFE) with parallel radio frequency (RF) rectifier, charge-transfer summation amplifier (CTSA), and successive approximation analog-to-digital converter (SAR ADC) stages. In a particular embodiment, the invention includes a 3.2 μW WRX with simplified 802.15.4g medium access control/physical layer (MAC/PHY) baseband, received signal strength indicator (RSSI) and clear channel assessment (CCA), forward error correction (FEC), and a cryptographic checksum for industrial IoT applications. The charge-domain AFE provides a conversion gain of 26 dB with no static bias currents used anywhere in the rectifier, CTSA, or SAR ADC. This provides robustness to process, voltage and temperature (PVT) variation, and pulsed interference rejection.

Embodiments combine an ADC, a FIR filter and digital baseband to make a wakeup radio. A FIR filter can be implemented by changing the $C_T$ value overtime as the filter coefficient and summing with previous ADC samples. ASK modulation and Manchester encoding is supported. On-off keying (OOK) is a subset of ASK modulation. With the ADC, the WRX is able to support additional information encoded in the ASK RF message. Manchester is also supported. Multiple carrier frequencies are supported. Aa an example, 100 MHz to 3 GHz is used for a practical performance. However, embodiments are capable of frequencies as low as ~10 MHz and as high as 100 GHz depending on the quality factor of matching network 302.

Figure 1:
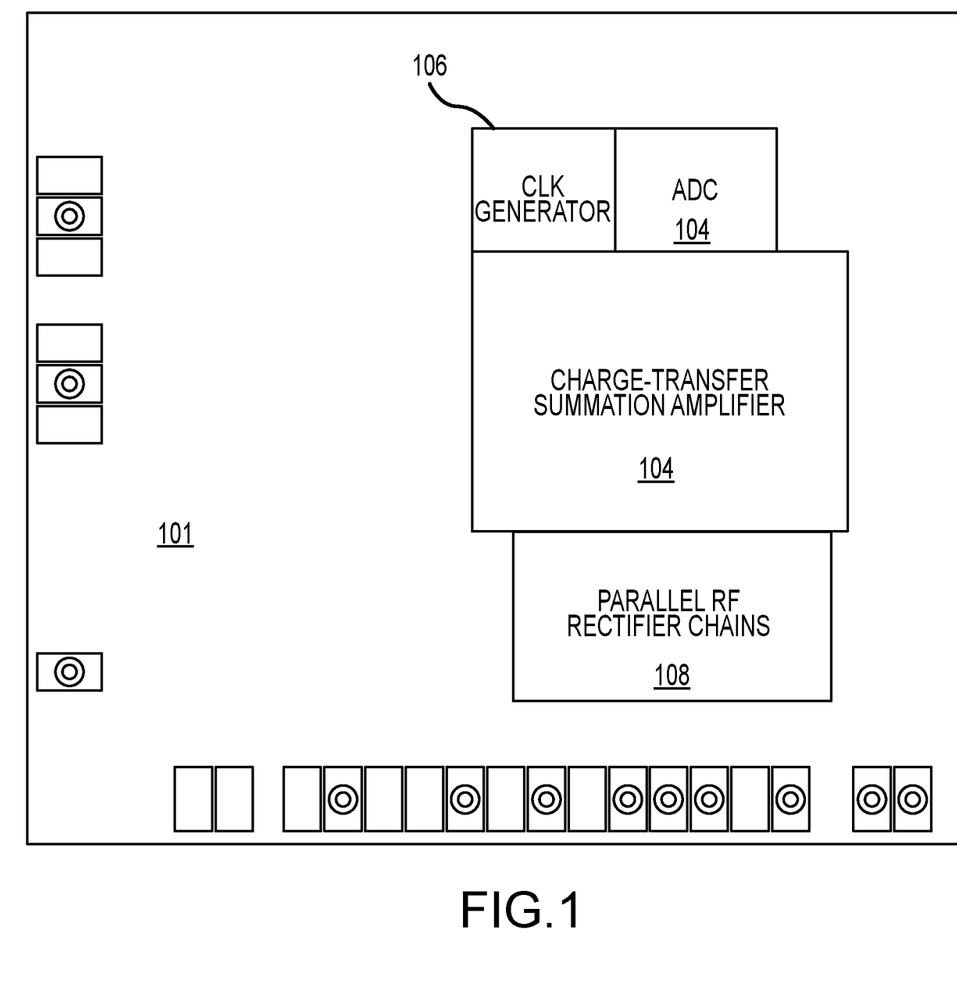
FIG. 1 is an illustration of a die including circuit components of a ULP receiver according to an embodiment.

FIG. 1 is an illustration of a die layout (also referred to here as integrated circuit (IC)) 101 including circuit components of a ULP receiver according to an embodiment. The die includes an integrated CTSA and ADC 104, a clock generation circuit (CLKGEN) 106, and an RF rectifier circuit 108. As will be described in further detail below, embodiments of the invention provide improvements by colocating capacitors of the CTSA with those of the ADC in the circuit 104.

Figure 1A:
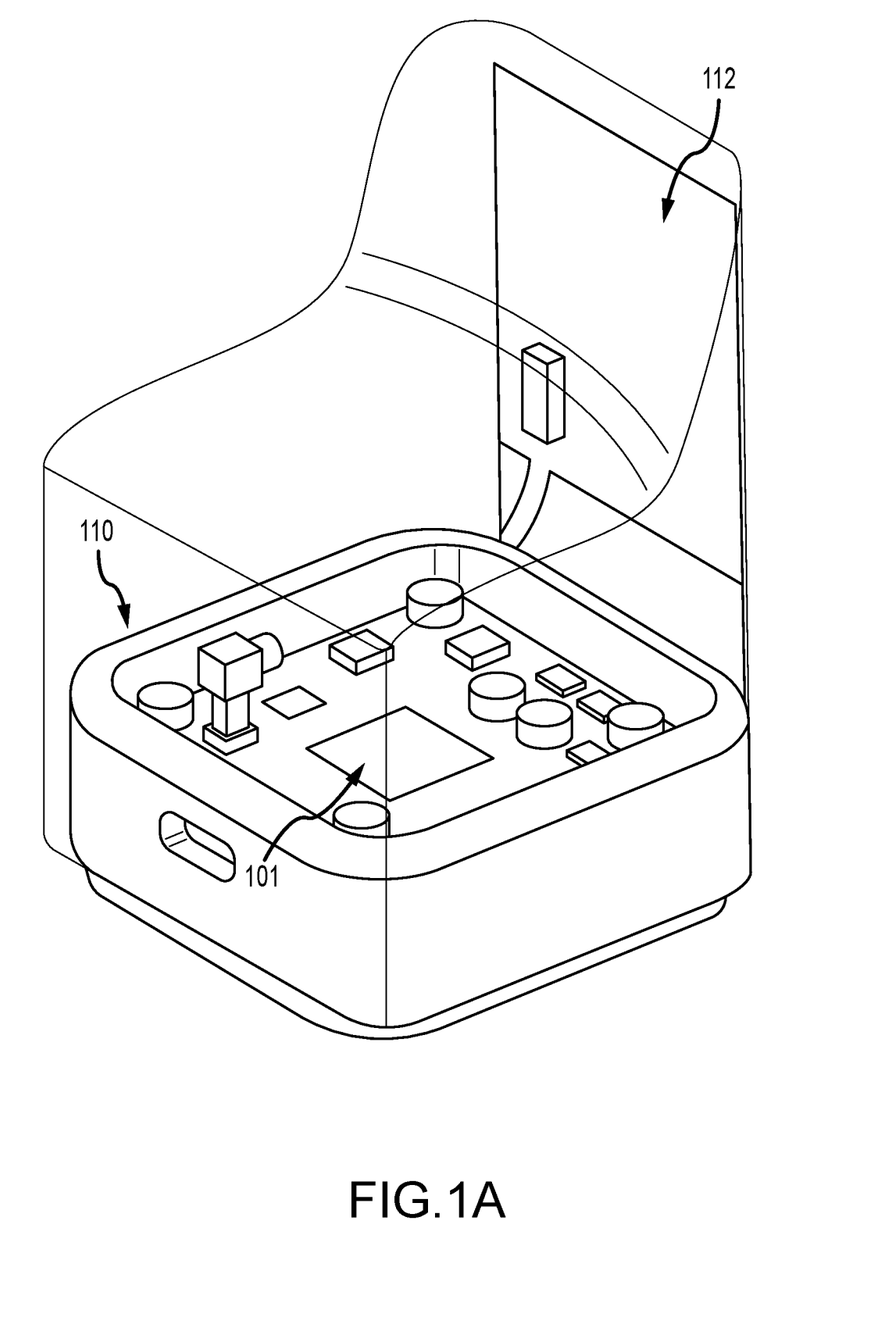
FIG. 1A is an illustration of a sensor node, according to an embodiment.

FIG. 1A is an illustration of a sensor node 110, according to an embodiment. The sensor node 110 has a form factor of approximately 5×5×8 cm³. In this illustration, an antenna 112 is shown before the node unit is sealed. The IC 101 is present on the sensor node 110.

Figure 2:
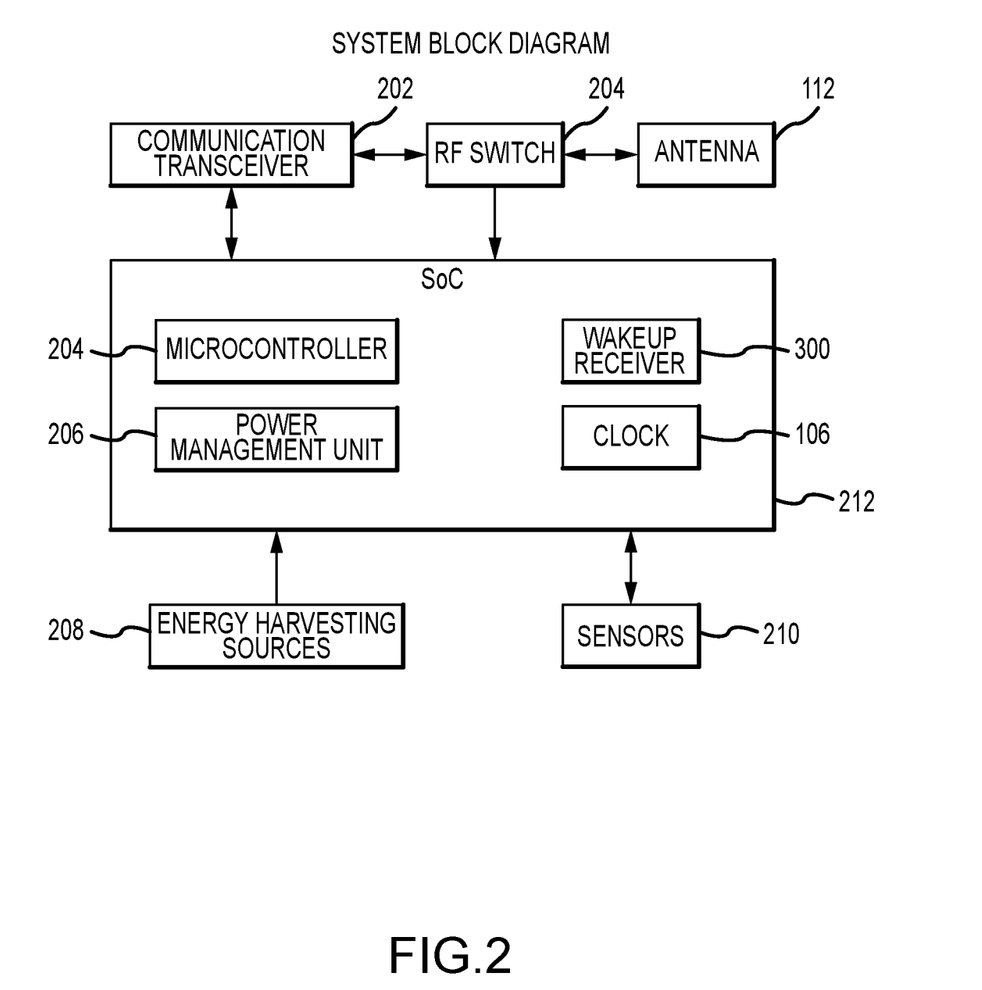
FIG. 2 is a system block diagram of a sensor node, according to an embodiment.

FIG. 2 is a system block diagram of a ULP receiver system. The system includes a Communication transceiver (Comm TRX) 202], a radio frequency switch (RF SW) 204, the antenna 112, energy harvesting input sources (EH-Sources) 208, and on-board sensors. A system-on-a-chip (SOC) 212 includes a microprocessor (MCU) 204, energy harvesting power management unit (EH-PMU) 206, CLK (or CLKGEN) 106, and WRX (also referred to herein as wakeup receiver or ULP receiver) 300.

Figure 3:
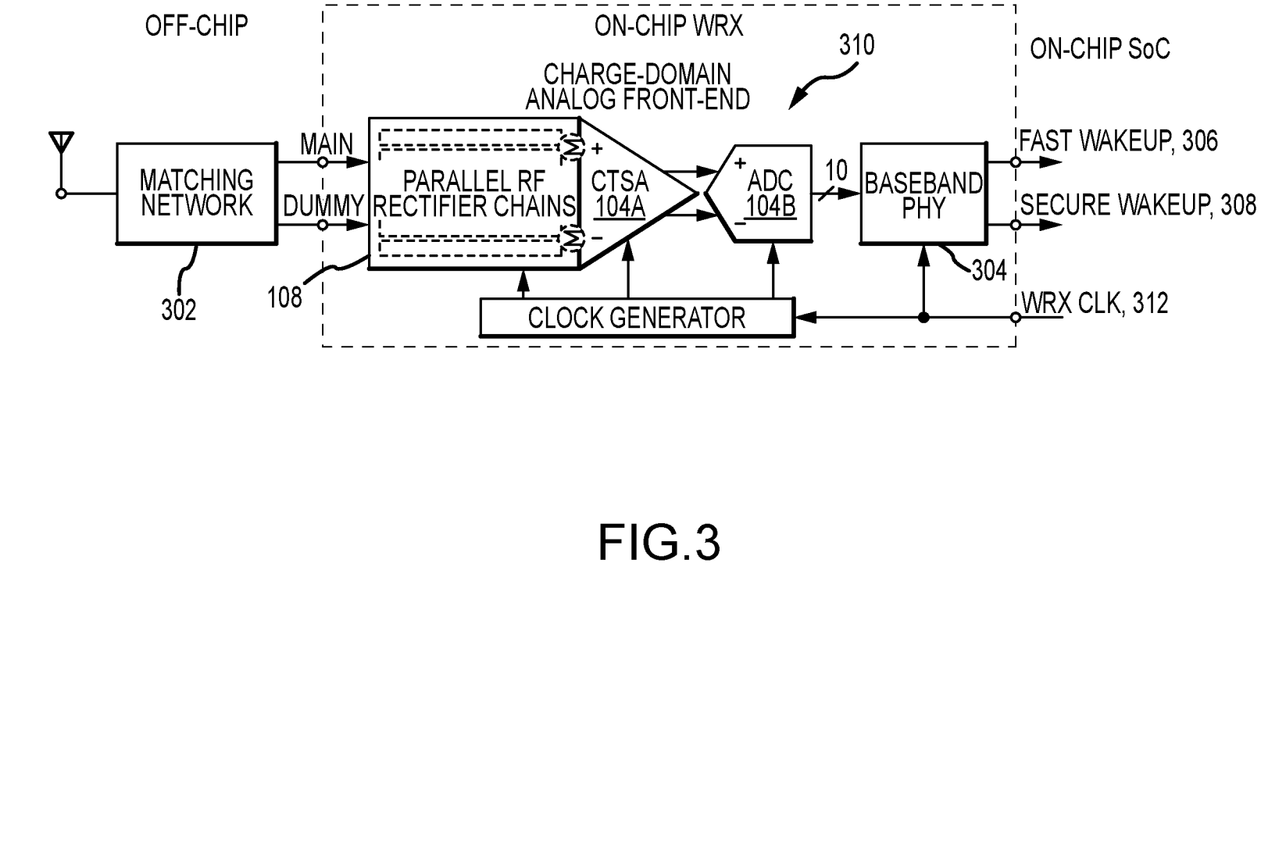
FIG. 3 is a block diagram of a wakeup receiver (WRX) circuit, according to an embodiment.

FIG. 3 is a block diagram of WRX circuit 300, according to an embodiment. In an embodiment, the WRX 300 is a fully-integrated sub-GHz WRX with charge-domain analog front-end in 65 nm CMOS. WRX 300 incorporates a simplified 802.15.4g MAC/PHY baseband, RSSI and clear channel assessment, forward error correction, and a cryptographic checksum. It achieves a sensitivity of −67.5 dBm, SIR of −15.3 dB, RSSI accuracy of ±3 dB, and power of 3.2 µW across PVT variation.

The WRX 300 is fully integrated into a system-on-a-chip (SoC) designed for an energy-harvesting industrial IoT leaf node, but is suitable for any type of node. A leaf node is typically an outer node in a sensor network. Signals from antenna 112 go through matching network 302. A main RF path (Main) from the antenna 112 and a dummy path (Dummy) from a broadband load form a pseudo-differential signal that improves common-mode rejection. In an embodiment, a conventional FR-4 substrate (a known glass-reinforced epoxy laminate material for printed circuit boards) and on-board inductor and capacitor (LC) components are used for the matching network 302 to the custom antenna 112.

The charge-domain AFE 310 comprises parallel RF rectifiers 108, a charge-transfer summation amplifier (CTSA) 104A, and a 10-bit SAR ADC 104B. The AFE 310 processes signals in the discrete-time charge domain as opposed to the traditional continuous-time analog approach. No static bias currents are required, providing low-power and robust operation over a wide range of conditions. In an embodiment, the WRX 300 down converts a Manchester encoded on-off keying modulation (OOK) RF wakeup message to baseband and digitizes the signal for demodulation, while providing reliable and rapid in-band and out-of-band interference rejection. The WRX 300 supports received signal strength indicator (RSSI) and CCA, used by the network layer for continuous traffic monitoring and link quality measurement.

Baseband physical layer (BB PHY) 304 receives signals from the ADC 104B and outputs a fast wakeup signal 306 and a secure wakeup signal 308. The network can be configured for either fast wakeups of only a Sync Word or secure wakeups with a full WRX beacon packet with cryptographic checksum that includes a payload for data transfer without the need for a high-power receiver.

A CLKGEN circuit 106, as further described below, controls the operation of the WRX 300. WRX CLK signal originates from an on-chip clock source using an on-board crystal reference.

Figure 4A:
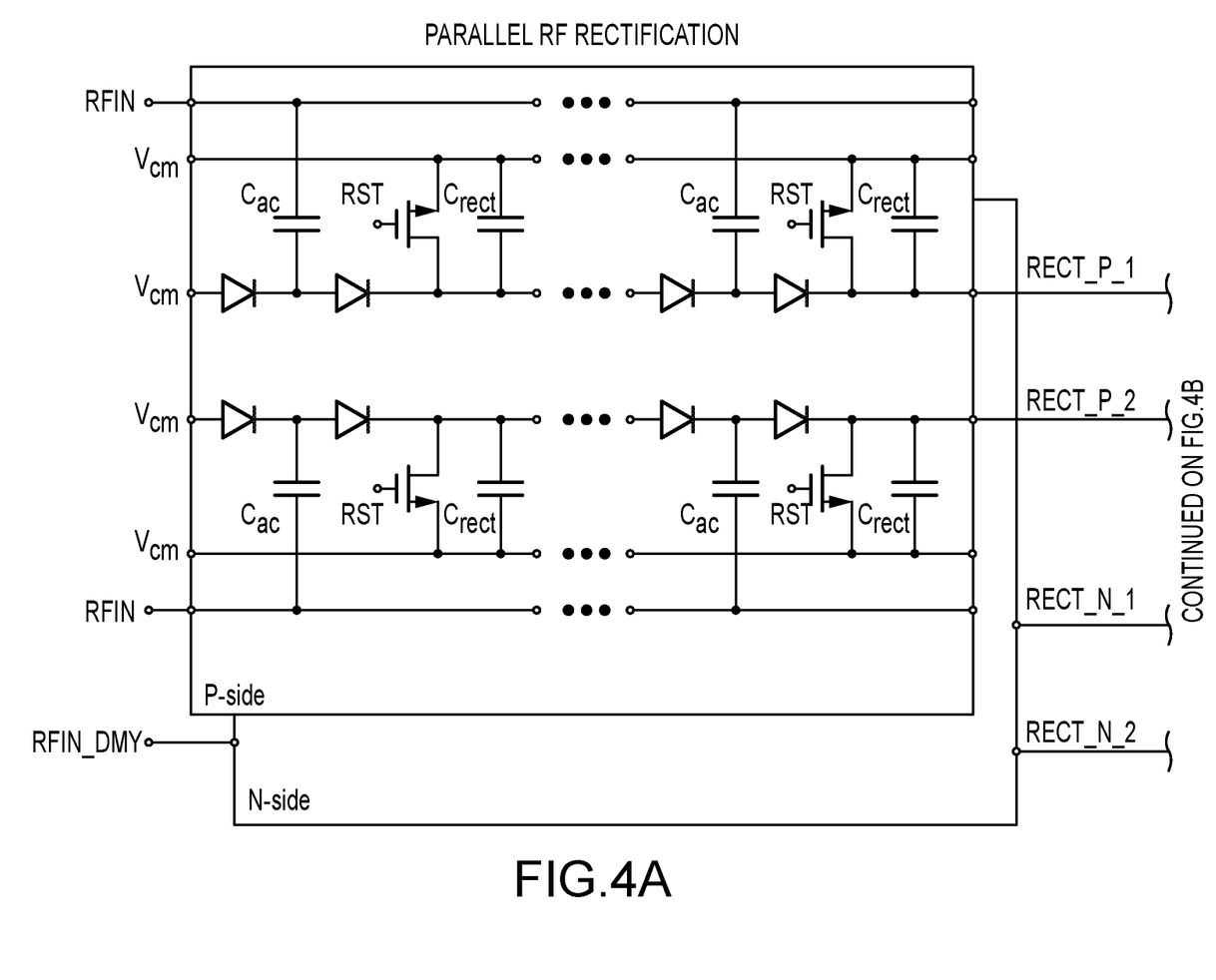
FIG. 4A is a diagram of a parallel radio frequency (RF) rectification circuit, according to an embodiment.
Figure 4B:
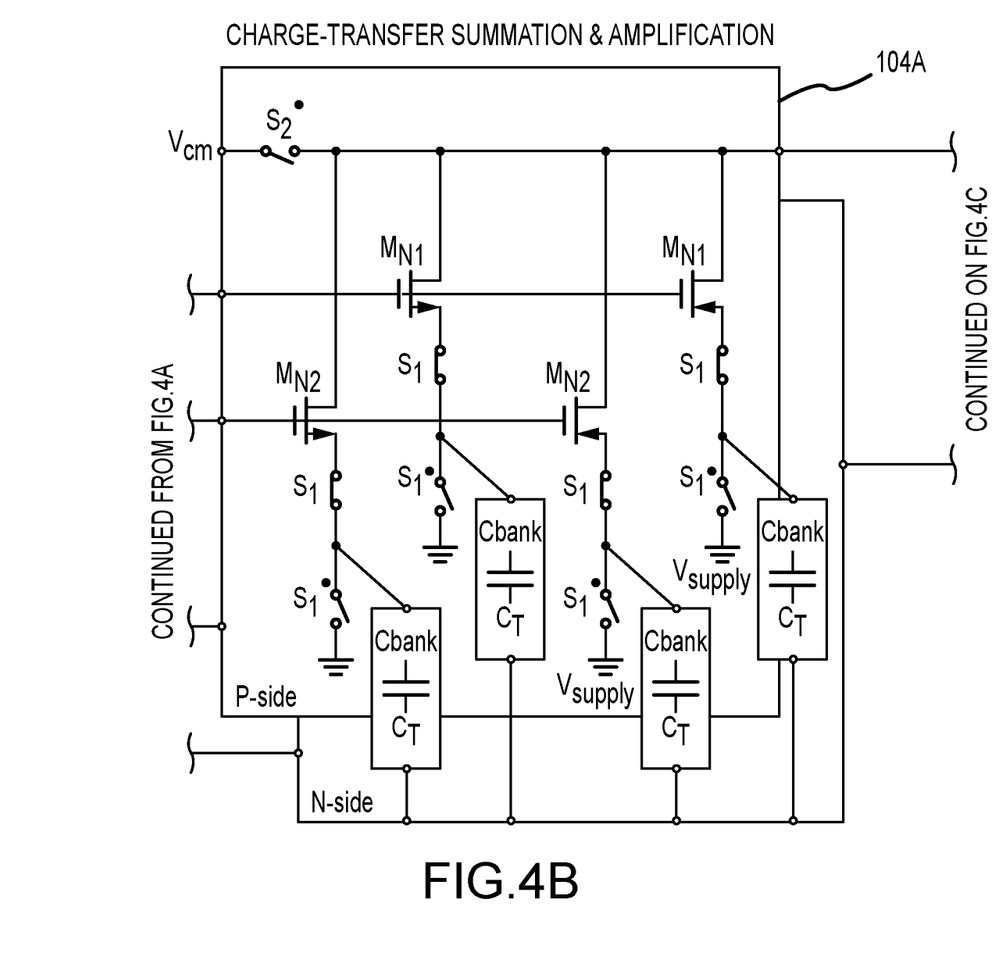
FIG. 4B is a diagram of a charge-transfer summation amplification (CTSA) circuit, according to an embodiment.
Figure 4C:
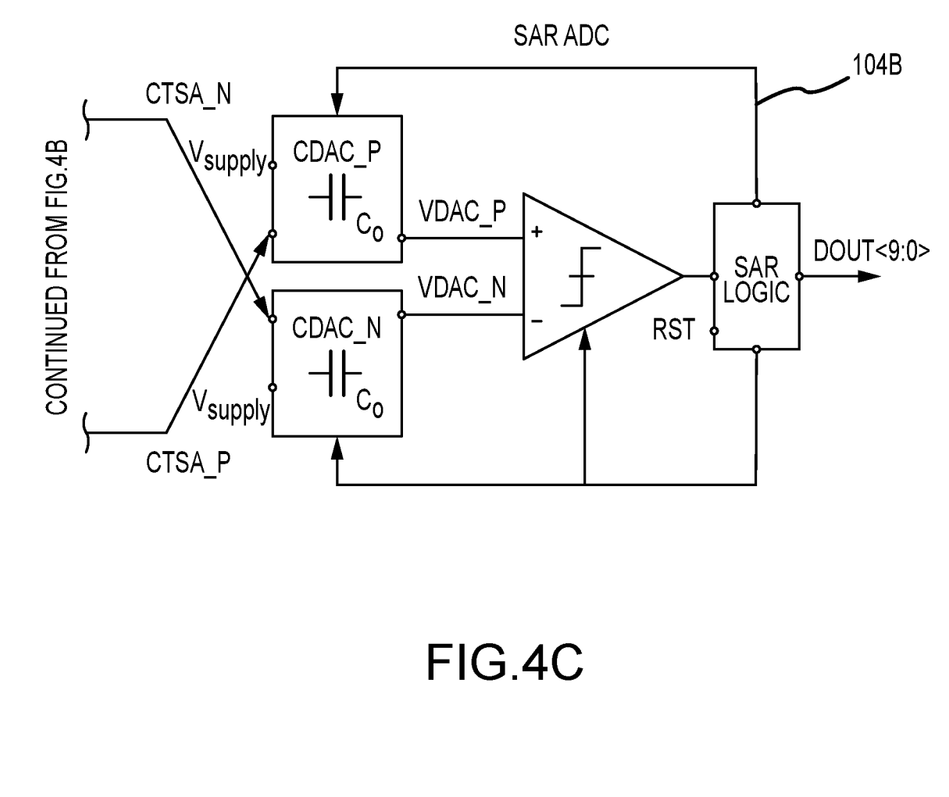
FIG. 4C is a diagram of a successive approximation analog-to-digital (SAR ADC) circuit, according to an embodiment.

FIGS. 4A, 4B and 4C illustrate an embodiment of a charge domain AFE 310 that features RF rectification, charge-transfer amplification, and SAR ADC conversion based on charge redistribution.

FIG. 4A is a diagram of an RF rectification circuit 108, according to an embodiment. In one embodiment, the RF rectification circuit 108 includes multiple Dickson rectifier chains in parallel and down converts the RF input signal to the rectifier cap $C_R$ as static charge. A reset phase (controlled by reset signal rst) is used in every stage, making sure there is no intersymbol interference caused by residual charge on $C_R$. This front-end therefore supports a wide dynamic range of input power levels (from sensitivity level up to 7 dBm) without automatic gain control.

In contrast to current solutions, parallel paths (leading to RECT_P_1 and RECT_P_2) achieve a high signal-to-noise ratio (SNR) and fast settling time. Specifically, longer chains (as in current solutions) produce higher settling times. As shown in FIG. 4A, embodiments include multiple (M) paths with (N) stages per path. e.g. 2×15, or 3×10. Then summing the M outputs from the N paths yields the final baseband output. This will settle faster than long chains because each M path is short (only N stages), yet has a better SNR compared to that of single N×M stages.

FIG. 4B is a diagram of a CTSA circuit 104B, according to an embodiment. The CTAA stage shares capacitors with ADC 104B, and performs differential discrete-time summation and amplification through switched-cap operation. CDAC_P and CDAC_N are reused by CTSA as $C_O$. The gain of the stage is determined by the capacitance ratio between $C_T$ and the ADC 104B $C_{DAC}$. At the interface at the output of the M paths (from FIG. 4A) summation and gain occurs. This is done in the charge domain for more robust operation. The CTA circuit 104B effectively takes multiple input branches, and sums them to a single output, to provide both summation and gain. The CTSA circuit 104B takes in M analog inputs, and weights and sums each input on the output in the charge domain, understanding that the output cap of the charge domain amp is the sample cap of an ADC. First, two parallel rectifier chains down-convert the RF input signal onto $C_{rect}$ as static charge. A reset phase in every stage prevents intersymbol interference caused by residual charge on $C_{rect}$ and enables a wide dynamic range of input power levels without AGC. The following CTSA stage takes in parallel RF rectifier outputs, reuses ADC input DACs as its output capacitor $C_O$, and performs differential discrete-time summation and amplification by a gain of $C_T/C_{DAC}$. The differential ADC samples from the CTSA output at the end of every cycle and performs asynchronous SAR operation based on charge-scaling $C_{DAC}$.

No static bias is used in the circuit.

FIG. 4C is a diagram of a SAR ADC circuit 104B, according to an embodiment. Circuit 104B receives CTSA_N and CTSA_P from the previous stage 104A and performs A/D conversion to generate multiple bits of DOUT, which is for digital baseband demodulation.

Figure 5:
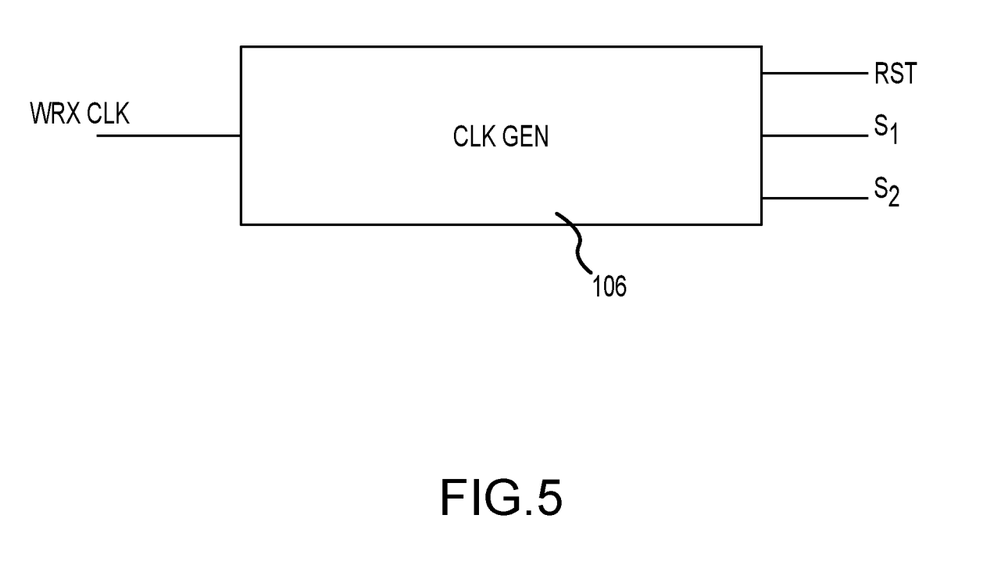
FIG. 5 is block diagram showing clock generation circuit inputs and outputs, according to an embodiment.

FIG. 5 is block diagram showing a clock generator block (CLKGEN) 106 that supports the discrete-time charge domain operation. CLKGEN 106 takes in the WRX clock signal and outputs S1, S2 and reset (RST) signals using logic gates, flip flops, and delay lines. The charge-domain AFE 310 seamlessly integrates RF down-conversion, baseband amplification, and A/D conversion without requiring driving-buffers and level-shifting circuits at each interface, thus saving power. The charge-domain topology is inherently robust against PVT variation because it is first-order bias and $V_{th}$ independent.

Figure 6:
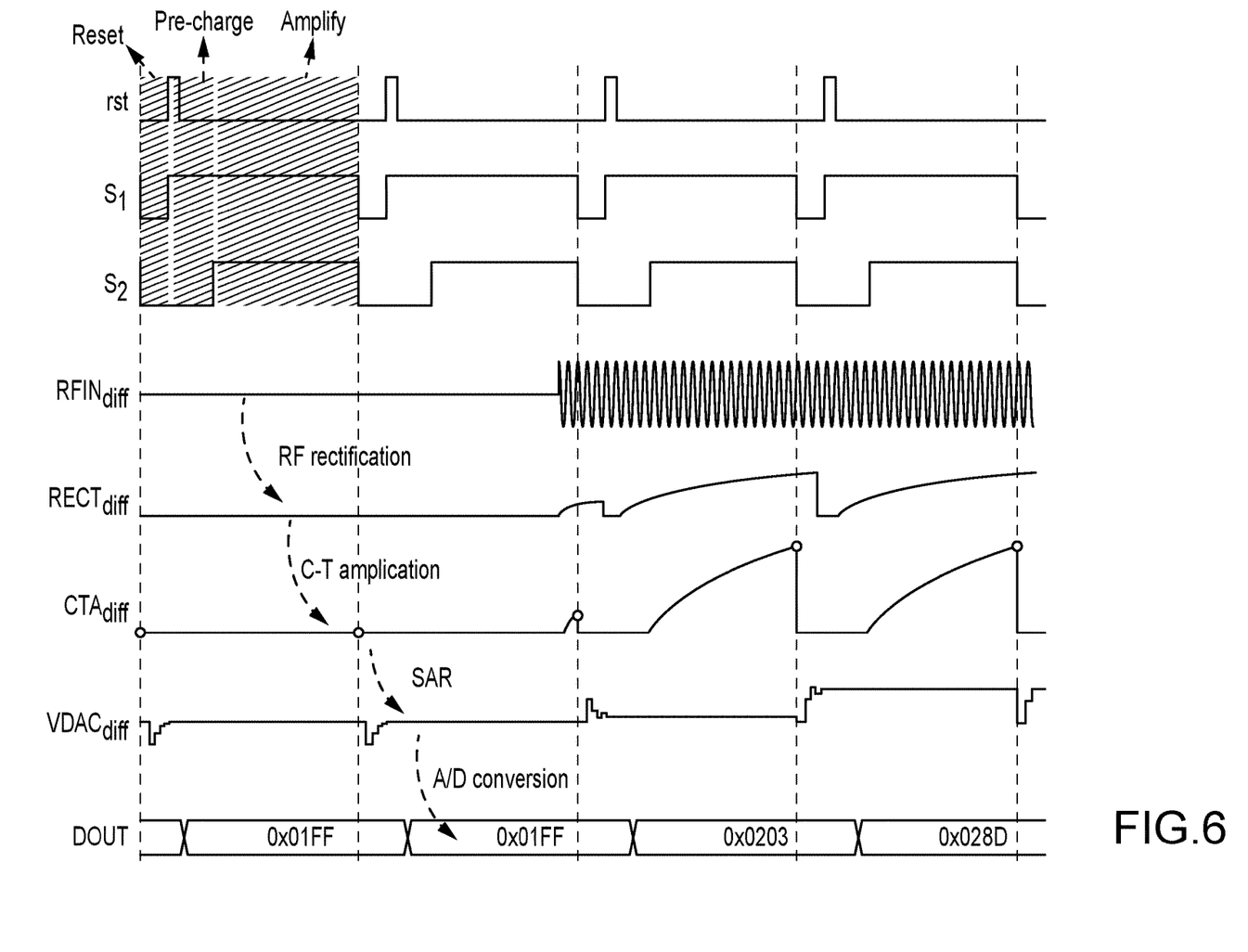
FIG. 6 is a series of signal timing diagrams illustrating ULP receiver operation, according to an embodiment.

FIG. 6 shows the timing and signal diagram of the AFE 310. Three clocking phases are required in every cycle of charge-domain operation. During the reset phase, $C_T$ is fully discharged, and $C_{DAC}$ is charged to $V_{cm}$. During the pre-charge phase, inputs are reset to $V_{cm}$, and source nodes of all the NFETs are charged to $V_{cm}-V_{th\_n}$, and $V_{cm}+V_{th\_p}$ for PFETs case. As a result, all the transistors serve as analog source followers in this phase. When in the amplify phase, the inputs connect to parallel rectifier outputs providing a delta $V_{in}$ (w.r.t $V_{cm}$), and the switch controlled by $S_2^*$ is released, initiating charge redistribution between capacitors $C_T$ and $C_{DAC}$. Therefore, the rectifier output is gained up by $C_T/C_{DAC}$ due to charge conservation. The effective capacitance of $C_T$ is tunable through a digitally controlled 6-bit capacitor bank, providing tunable gain in the AFE. Finally, the differential ADC samples from the CTA output at the end of every cycle and performs a 10-bit asynchronous SAR operation based on charge-scaling $C_{DAC}$.

In an embodiment, the WRX is fabricated in 65 nm CMOS and occupies 0.33 mm². It shows the measured results from 15 parts at 6 temperature points between −40° C. to 85° C. without any trimming. All measurements are reported with the SoC on-chip switching regulators and clock. Across PVT, the WRX achieves a mean sensitivity of −70.2 dBm for fast wakeup and −67.5 dBm for secure wakeup under 10% of packet error rate (PER), enabling in-network range in deployed industrial environments of 250 m, non-line-of-sight. It also demonstrates the in-band selectivity performance of the WRX under CW interference at −500 kHz offset. A mean signal-to-interference ratio (SIR) of −16.5 dB is measured for fast wakeup and −15.3 dB for secure wakeups. A −65 dB out-of-band SIR at 1.485 GHz offset (2.4 GHz) is achieved with the additional help from an on-board LC matching network without a SAW filter. In-band selectivity under AM-type interference of an OOK packet with the same bit rate is also measured, showing an SIR of 0 dB at 0 Hz offset, demonstrating a fast interference rejection capability. The WRX achieves an RSSI accuracy within ±3 dB from −67 dBm to −43 dBm without calibration. The measured power for secure wakeup is shown in FIG. 5, with a mean across PVT of 3.2 µW. A false-alarm rate of less than $10^{-3}$ is measured for both wakeup modes.

What is claimed is:

1. An ultra low-wakeup receiver (WRX) system, comprising:
    a matching network that receives signals from an antenna in a sensor network and outputs signals on a main RF signal from the antenna and a dummy signal from a broadband load, wherein the main RF signal and the dummy signal form a pseudo-differential signal that improves common-mode rejection; and
    an on-chip WRX comprising a charge-domain analog front end (AFE) configured to receive the pseudo-differential signal, and to output to the sensor network a fast wakeup signal and a secure wakeup signal, wherein the WRX operates at very low power, exhibits above-average sensitivity, and accomplishes random pulsed interferer rejections.

2. The system of claim 1, wherein the AFE further comprises:
    an RF rectifier circuit that processes the received RF signal as multiple signal paths M; and
    an amplifier circuit configured to receive output from the RF rectifier circuit and perform summation and amplification operations on the received output from the multiple signal paths M, wherein the amplifier circuit is a trans-impedance amplifier circuit.

3. The system of claim 2, wherein the AFE further comprises an analog-to-digital (ADC) circuit configured to receive an output of the amplifier circuit, and to convert the received output to a digital baseband format.

4. The system of claim 3, wherein the AFE further comprises a baseband physical layer configured to receive signals from the ADC and to output the fast wakeup signal and the secure wakeup signal.

5. The system of claim 4, wherein a sensor network in which the system resides is configurable for either fast wakeup signals of only a Sync Word or secure wakeup signals with a full wakeup receiver beacon packet with cryptographic checksum that includes a payload for data transfer without the need for a high-power receiver.

6. The system of claim 5, wherein the system is capable of frequencies as low as ~10 MHz and as high as 100 GHz depending on a quality factor of the matching network.

7. The system of claim 2, wherein multiple capacitors M are configured to receive outputs from multiple rectifier circuits M, and wherein the amplifier circuit is configured to receive output from the multiple capacitors M and perform summation and amplification operations on the received outputs from the multiple parallel signal paths M.

8. The system of claim 2, wherein the amplifier circuit is a charge domain amplifier circuit and at least the summation operation is performed in the charge domain.

9. The system of claim 1, wherein the received RF signals comprises amplitude shift keying (ASK) modulation.

10. The system of claim 1, wherein the received RF signals comprises Manchester encoding.

11. The system of claim 2, wherein the on-chip WRX is configured to operate at multiple carrier frequencies.

12. The system of claim 1, wherein the outputs of the on-chip WRX include information regarding received signal strength.

13. The system of claim 3, wherein the ADC circuit is a successive approximation analog-to-digital (SAR ADC) circuit.

14. The system of claim 2, wherein the amplifier circuit is further configured to receive output from the RF rectifier circuit and perform a differencing operation on the received output.

* * * * *